Sidney Rosen
INVENTOR

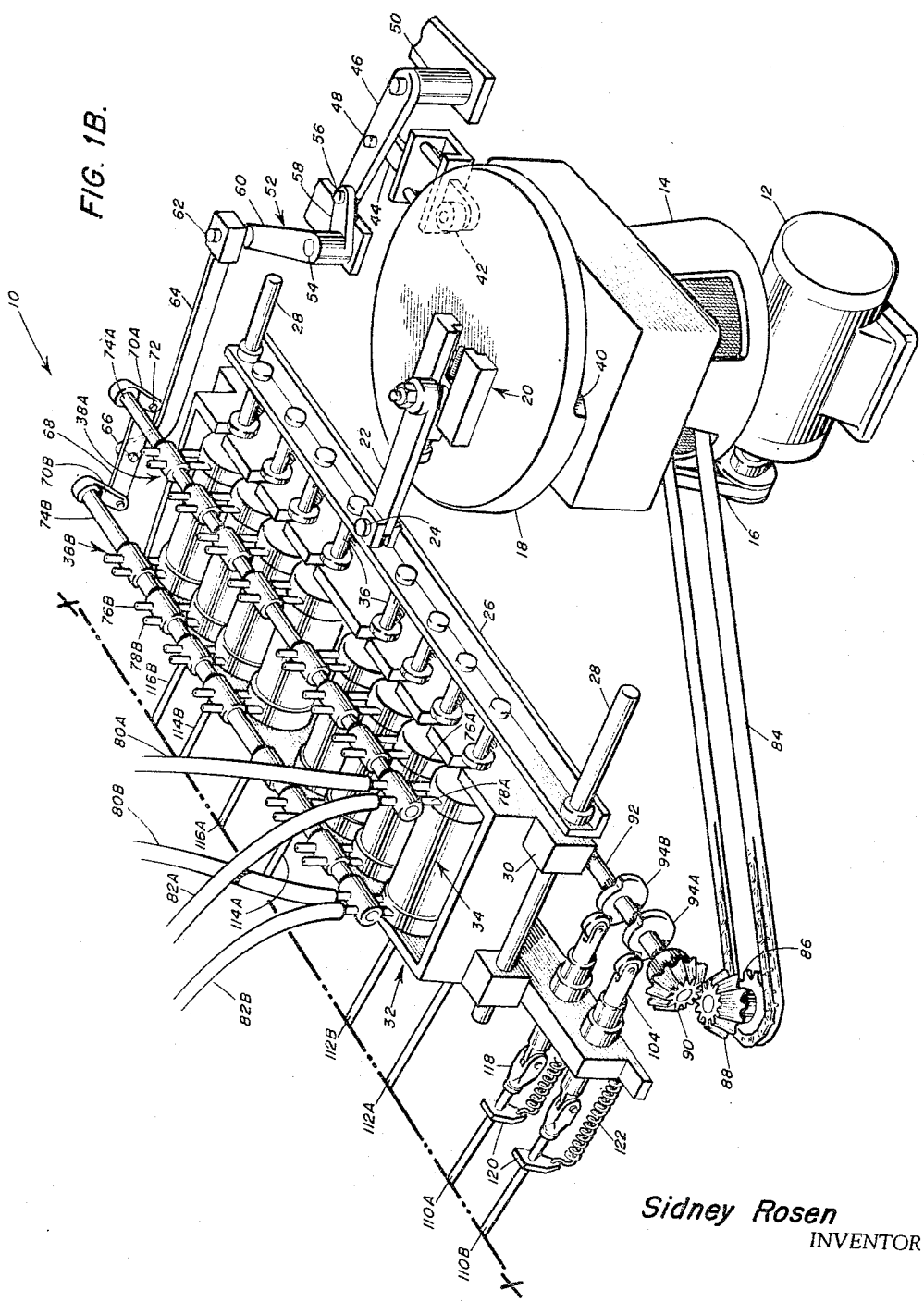

BY Walter G. Finch
ATTORNEY

May 30, 1967  S. ROSEN  3,322,167
HIGH SPEED STRAIGHT LINE FILLING MACHINE
Filed July 2, 1964  8 Sheets-Sheet 5

Sidney Rosen
INVENTOR

BY Walter G. Finch
ATTORNEY

May 30, 1967

S. ROSEN 3,322,167

HIGH SPEED STRAIGHT LINE FILLING MACHINE

Filed July 2, 1964

Sidney Rosen
INVENTOR

BY Walter G. Finch
ATTORNEY

May 30, 1967 S. ROSEN 3,322,167
HIGH SPEED STRAIGHT LINE FILLING MACHINE
Filed July 2, 1964 8 Sheets-Sheet

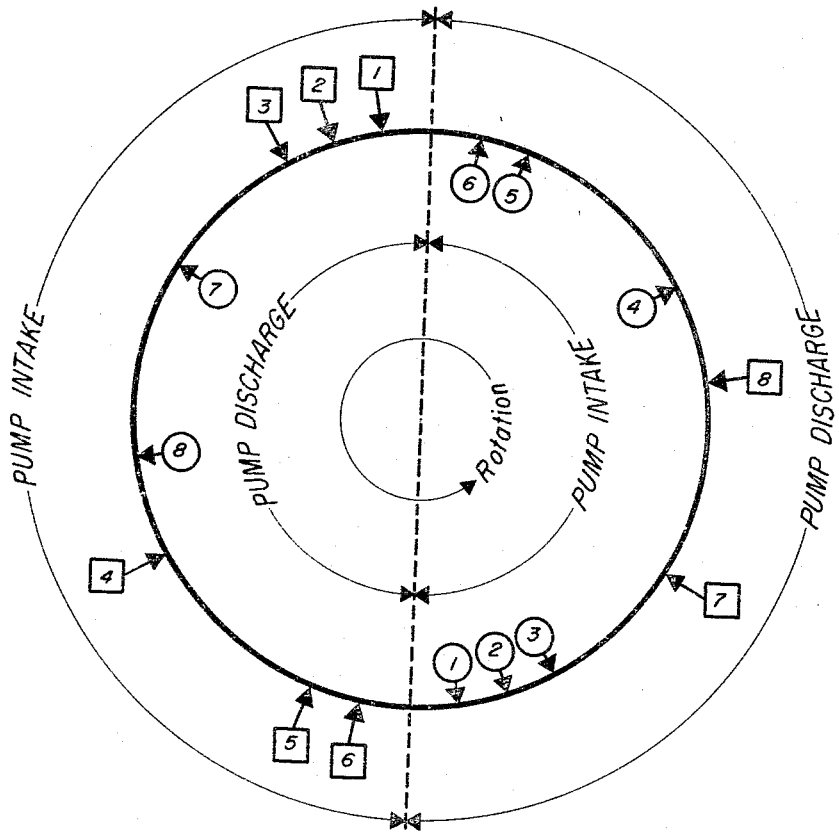

1 - Nozzles 178 Rise
2 - 1st Finger 146 Withdraws - Releases Filled Containers
3 - 2nd Finger 222 Withdraws To Allow Entrance Of Empties
4 - 1st Finger 146 Projects To Stop Empties
5 - Sensing Finger 202 Projects (No Bottle Stops Machine)
6 - Nozzles 178 Drop
7 - 2nd Finger 222 Projects To Hold Back Empties
8 - Sensing Finger 202 Withdraws

FIG. 8.
OPERATING CYCLE

KEY:
☐ "A" SIDE OF CONVEYOR
◯ "B" SIDE OF CONVEYOR

INVENTOR
Sidney Rosen

BY Walter G. Finch
ATTORNEY

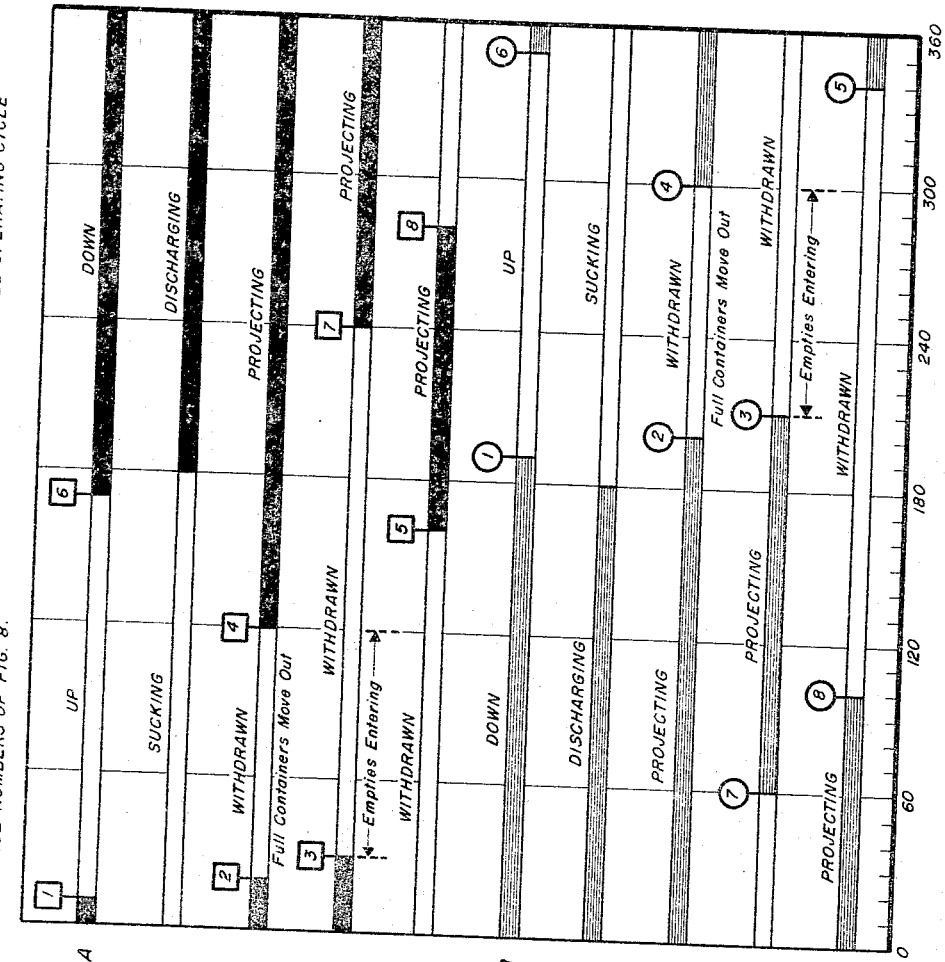

United States Patent Office 3,322,167
Patented May 30, 1967

3,322,167
HIGH SPEED STRAIGHT LINE FILLING
MACHINE
Sidney Rosen, 4119 Fordleigh Road,
Baltimore, Md. 21215
Filed July 2, 1964, Ser. No. 379,885
6 Claims. (Cl. 141—131)

This invention relates generally to material handling machine and more particularly it pertains to a plural line machine for filling groups of containers with accurate quantities of fluid at high speed.

An object of this invention is to provide a high speed filling machine of the straight line conveyer type which is adaptable to any size of container, fills containers while stationary in alternate groups, and operates completely automatic.

Another object of this invention is to provide a filling machine which doubles the container complement per filler pump.

A feature of this machine is the provision of stationary nozzles in conjunction with positive acting cut-off valves to avoid spillage.

Other objects and attendant advantages will become more readily apparent and understood from the accompanying specification and drawings in which:

FIG. 1A and FIG. 1B taken together constitute a somewhat diagrammatic fragmentary perspective illustrating the principles of a novel filling machine;

FIG. 8 is a diagram of one operating cycle of the filler pumps; and

FIG. 9 is a diagram of one operating cycle of the machine.

Figure 1A:
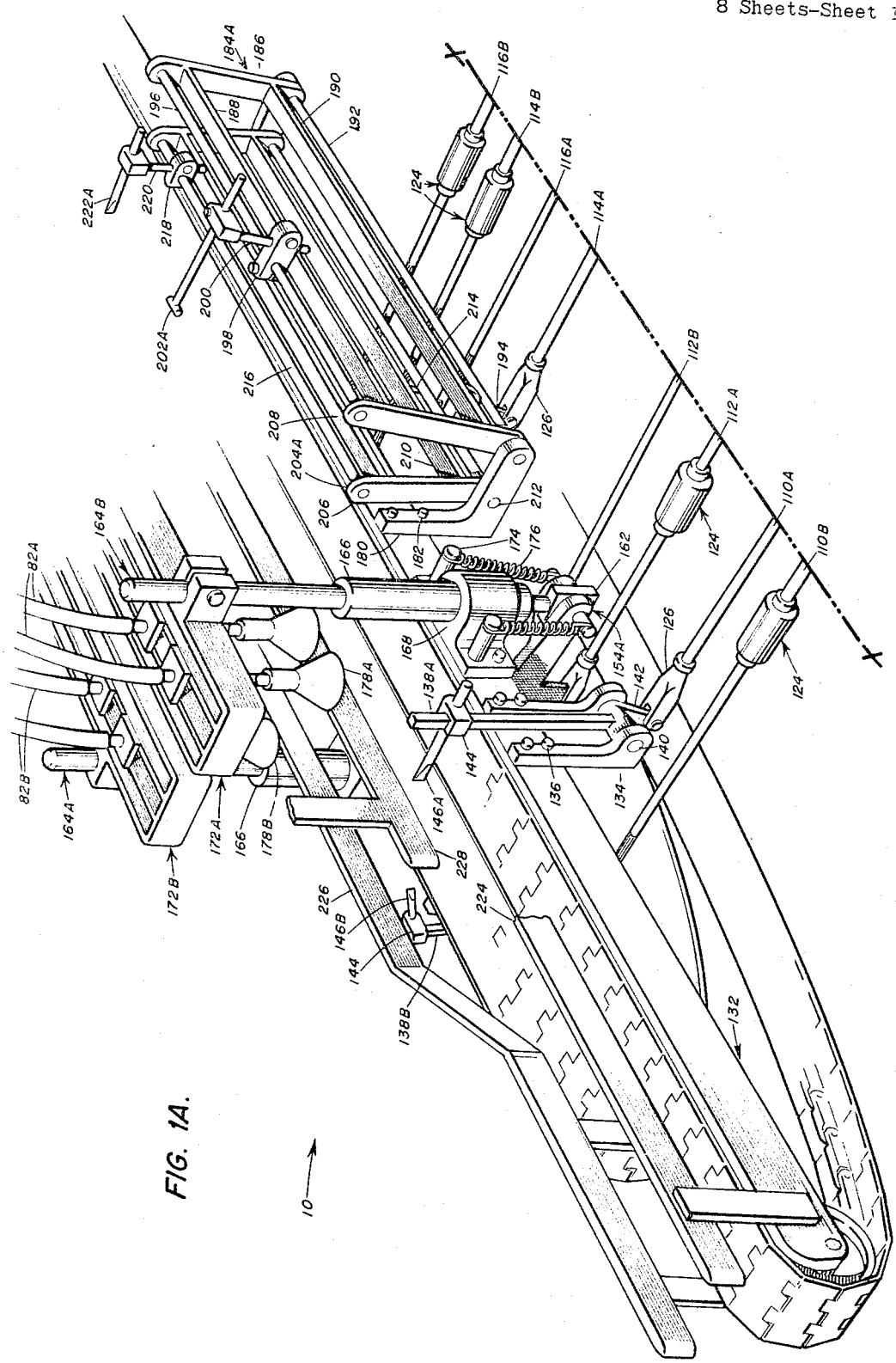

Referring now to the details of the drawings as shown in FIG. 1B, reference numeral 10 indicates generally a filling machine embodying principles of this invention.

In the example illustrated sixteen (16) containers are filled by eight (8) pumps in one cycle of operation.

The machine 10 employs a variable speed filler motor 12 which drives a speed reduction gear box 14 by means of belt 16.

The gear box 14 rotates a horizontal drive and cam plate 18. A throw adjustment assembly 20 mounted on the plate 18 operates in crank fashion a pivoted connecting or drive rod 22.

A cross head 26 which reciprocates on parallel guides 28 is provided at its center with a pin 24 to which the drive rod 22 is pivotally joined.

The guides 28 are fastened to and extend from bosses 30 on the ends of a rectangular open pump box 32.

The box 32 is slotted to receive the ends of eight (8) individually removable double acting pumps 34. Adjustable pistons rods 36 extend from each pump 34 through the side of the box 32 and are removably attached to the cross head 26. Thus all pumps 34 operate as a unit when the drive rod 22 moves and this stroke is adjustable by means of the previously mentioned throw adjust assembly 20 or for the individual pumps by the piston rods 36.

At this point it should be explained that the machine elements working with the two lines or sides of the conveyer will be designated as to which side they serve by a suffix letter A or B after the reference numeral.

Thus the ends of the pumps 34 have identical valves 34, those at one end being designated 34A and those at the other end 34B.

These valves 34 are of the rotary two-way type which open one passageway and close another. All the valves 34A are aligned axially and joined together serially easily by removable linkage. Similarly all the valves 34B are joined.

A camming groove 40 is formed on the underside of the drive and cam plate 18 and a cam follower 42 travels therein. A link 44 from the cam follower 42 is pivotally attached by means of a pin 48 to a lever 46. The lever 46 is pivoted on a fulcrum 50 and transmits the motion of the cam follower by means of pin 56 to a bell crank 52. One arm 58 of the bell crank 52 is mounted on another fulcrum or pivot 54.

The other crank arm 60 of bell crank 52 has a pin 62 which engages with one end of a push-pull rod 64. The other end of rod 64 engages a pin 66 at the center of a connecting link 68. Pins 72 join each of the ends of this link 68 to a valve crank 70, valve crank 70A being on a valve shaft 74A for the valves 38A and valve crank 70B on a shaft 74B for valves 38B.

With the foregoing arrangement the valves 38 and piston rods 36 operate in synchronism, for example: at one end of a stroke of the pumps 34 inlets 76A and outlets 78B are opened simultaneously with inlets, 76B and outlets 78A closing. The inlets 76 connect through receiving hoses 80 to a common manifold of a fluid storage tank not shown. The outlets 78 of the valves 38 connect individually by hoses 82 to dispersing nozzles as will be related.

Figure 2:
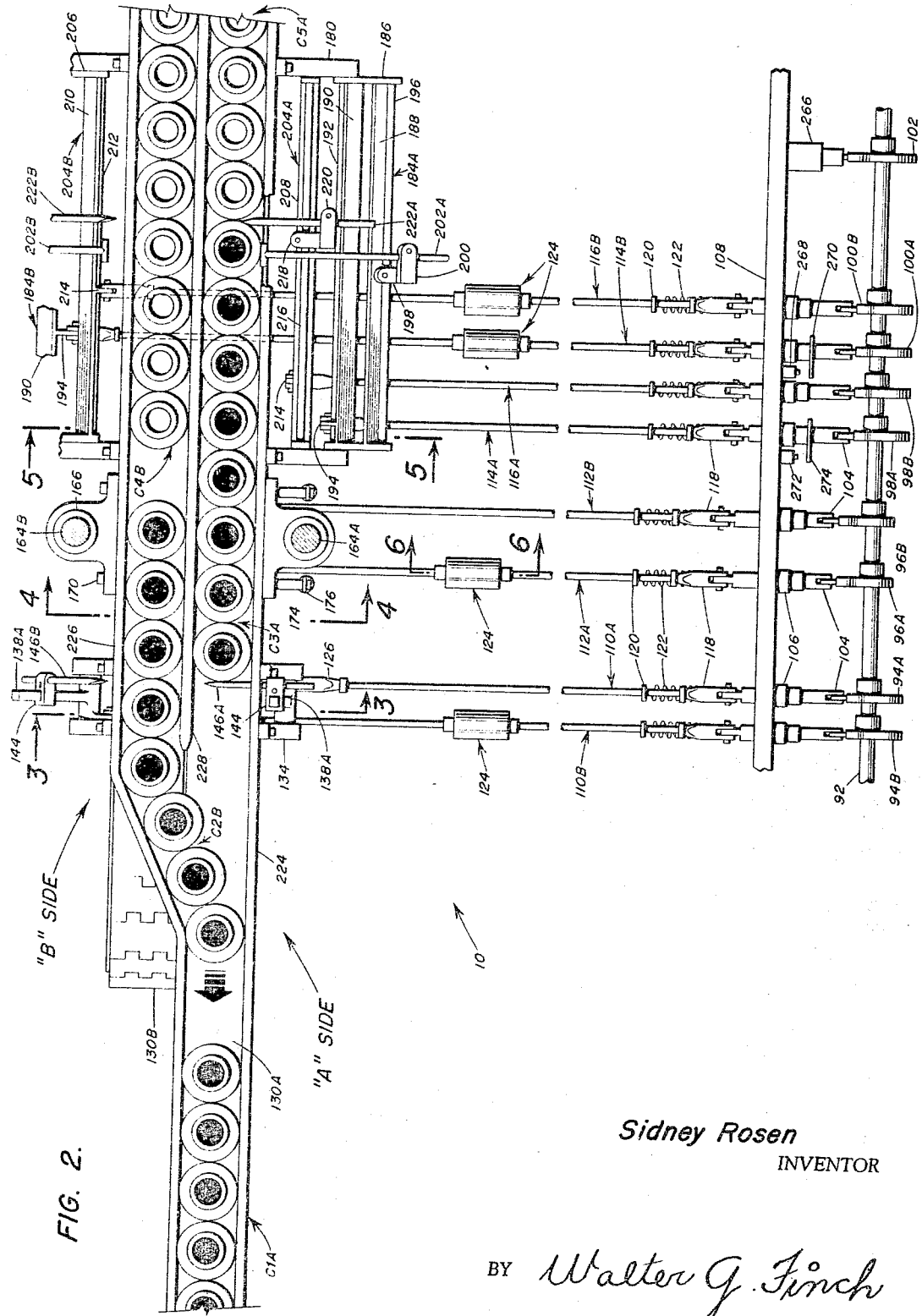
FIG. 2 is a plan view of the machine of FIGS. 1A and 1B.

The gear box 14 drives a cam shaft 92 through a drive chain 84, a sprocket 86, and a pair of bevel gears 88 and 90. As best shown in FIG. 2, cams 94, 96, 97 and 100 in A, B pairs each one secured in spaced relationship on the shaft 92 in the order stated and arranged to move cam followers 104 which reciprocate in sleeves 106 in a beam 108 of the machine framework. Another cam 102 is positioned on shaft 92 to operate a sensitive switch 266.

Push-pull rods 110, 112, 114, 116 (A and B each) are attached to the cam followers 94, 96, 98 and 100 respectively, by hinged and adjustable rod ends 118. Tension coiled return springs 122 attached to rod clips 120 bias the cam followers 104 against their respective cams as besh shown in FIG. 1B.

With reference to FIGS. 1A and 2 the rods 110, 112, 114, 116 (A and B) extend to a conveyor chassis 132, each terminating in other rod ends 126.

Figure 3:
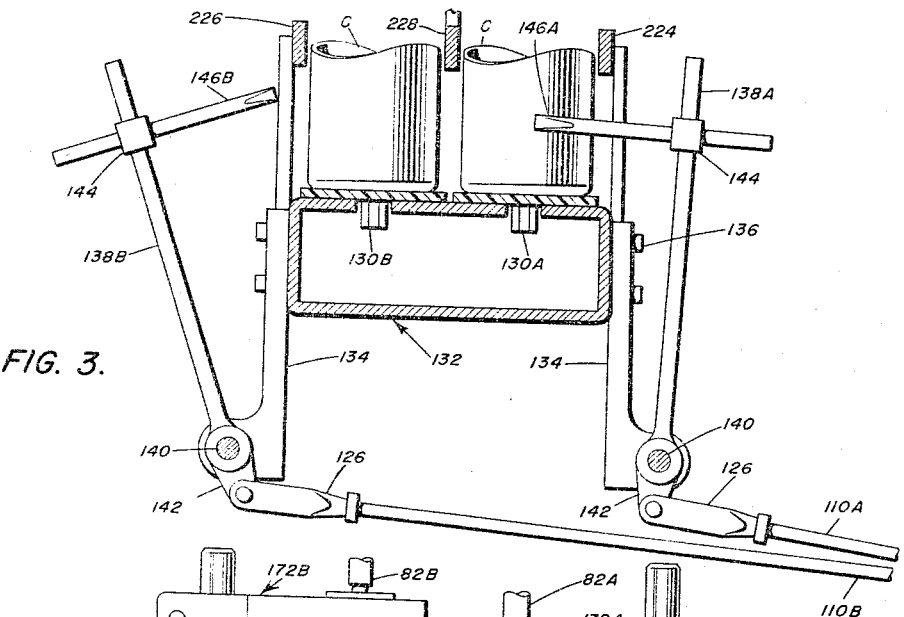
FIG. 3 is a vertical section of the downstream holding area of the conveyer taken on line 3—3 of FIG. 2.
Figure 4:
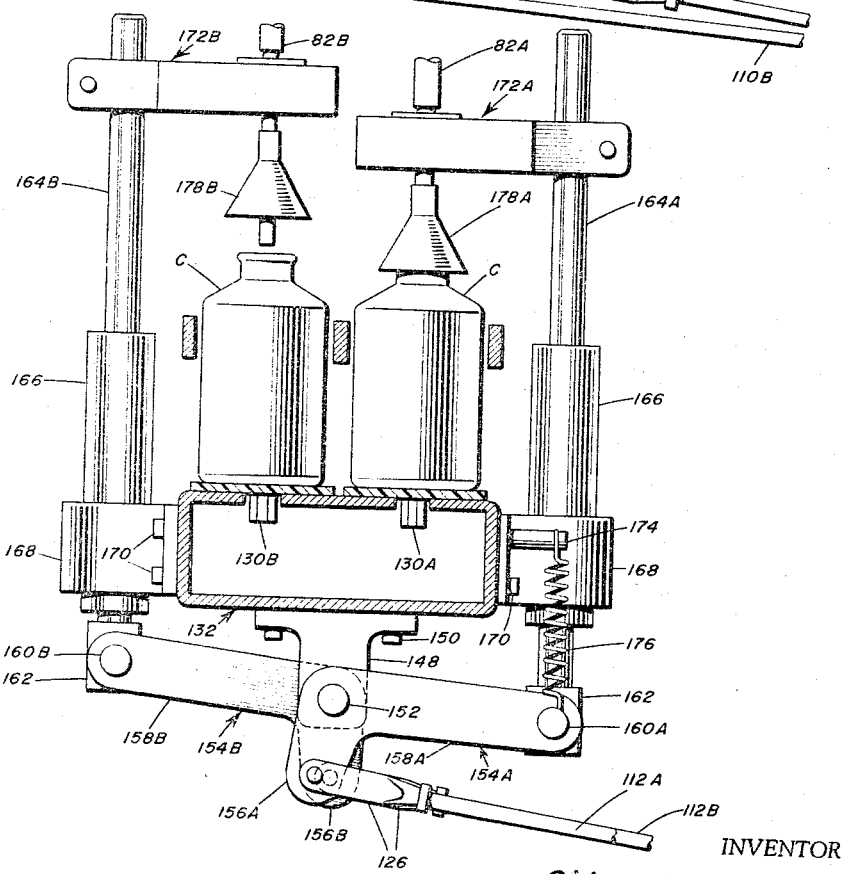
FIG. 4 is a vertical section of the filling area taken on line 4—4 of FIG. 2.
Figure 5:
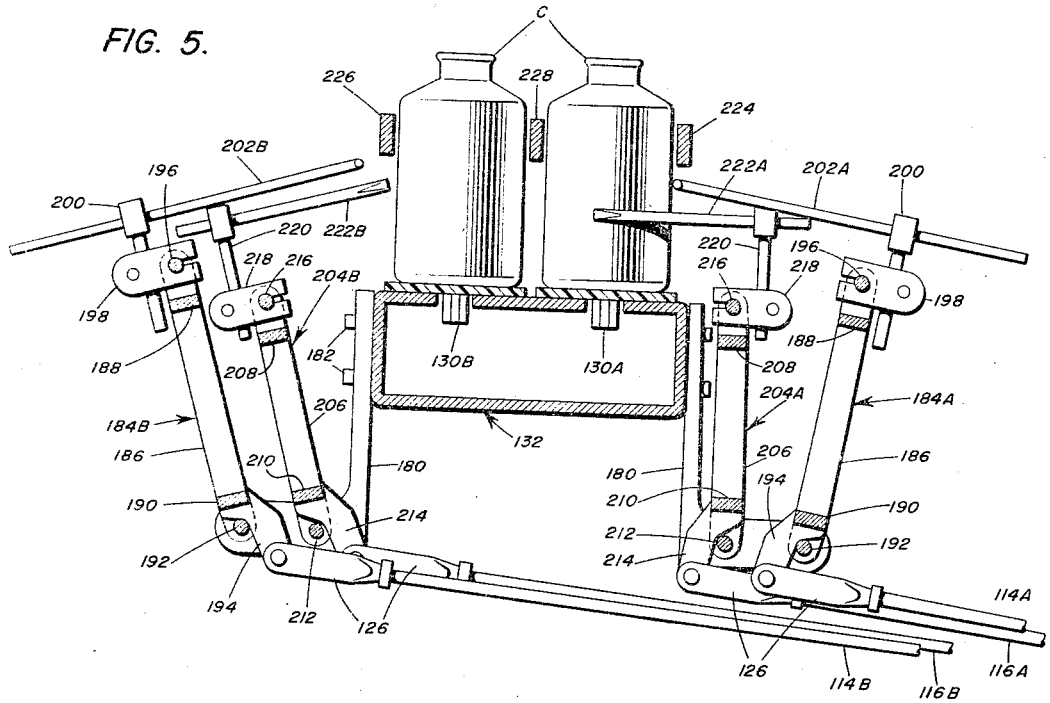
FIG. 5 is a vertical section similar to FIGS. 3 and 4 taken on line 5—5 of FIG. 2 and illustrating the upstream end of the filling area.

By these ends 126 the rods 110, 112, 114, and 116 are articulated respectively to cranks 142, short arms 156, cranks 194 and 214 as best shown in FIGS. 3, 4, and 5.

The cranks 142 are extensions of posts 138 which oscillate on pivots 140 set in brackets 134 depending from the conveyer chassis 132 and secured by cap screws 136. The posts 138 carry first fingers 146 adjustably mounted with fittings 144.

The oscillation of a finger 146 into the path of containers C interrupts their passage down a continuously moving belt 130 of the conveyer 132.

With special reference to FIGS. 1A and 4 the rods 112 function to position fluid dispensing nozzles 178 onto the containers C. The nozzles 178 are adjustably mounted in plurality on frames 172. These frames 172 are arranged to raise and lower on columns 164 which reciprocate in vertical sleeves 166. The sleeves 166 are attached by means of supports 168 fastened by cap screws 170 on the sides of the conveyer 132.

The lower ends of columns 164 have rod ends 162 provided with pins 160. The previously mentioned short arms 156 are extensions of bell cranks 154 which pivot on a fulcrum pin 152. The fulcrum pin 152 is in a fulcrum block 148 mounted on cap screws 150 under the conveyer 132. The long arms 158 of the bell cranks 154 engage with the pins 160 to work the columns 164.

The bell crank 154A is assisted in raising the nozzle frame 172A by means of a tension coiled spring 176 which depends from a spring hanger 174 on the conveyer 132.

Delivery hose 82 connect the nozzles 178 to the outlets 78 of the pump valves 38.

With reference to FIGS. 1A and 5 each side of the conveyer 132 is provided with a pair of L shaped brackets 180 secured by screws 182. A pair of parallel fulcrum shafts 192 and 212 are mounted on each pair of brackets 180. The shaft 192 carries a lower cross member 190, the shaft 212 a lower cross member 210.

The member 190 has the crank extension 194 which is articulated to the rod end 126 of push-pull rod 114. The member 210 similarly has the crank 214 which articulates to rod 116 as previously recited.

Parallel side members 186 in conjunction with an upper cross member 188 and the lower cross member 190 constitute a rectangular rocking frame 184.

In like fashion a frame 204 is formed on the cross member 210 by sides 206 and an upper cross member 208.

A horizontal rod 196 extends between the upper ends of the sides 186 of frame 184. This rod 196 carries an adjustably fitting 198 in which a post 200 is clamped.

A T-shaped cam sensing finger 202 is adjustably secured in the post 200.

The upper ends of sides 206 of rocking frame 204 also carry a rod 216, a fitting 218 and post 220. This post 220 has an adjustable second finger 222 similar to the first finger 146 previously mentioned in conjunction with FIG. 3 and performs a like function in halting containers C on the conveyer belts.

The containers C are guided on the belts 130 by positionable rails 224, 226 and 228. The center rail 228 is supported from the overhead structure of the machine and is relatively short on the downstream side. Here the outer rail 226 converges toward the inner rail 224 and guides the containers on the B side over to the A side to merge with the alternately released units there.

Figure 6:
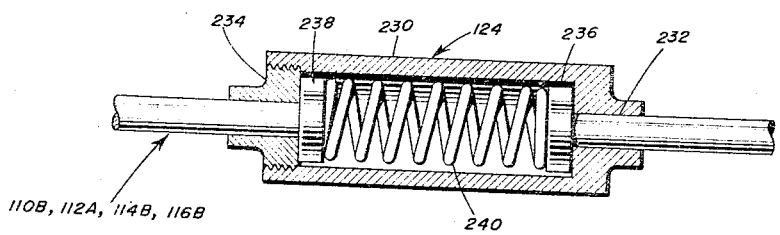
FIG. 6 is an enlarged longitudinal section of a spring cup assembly taken on line 6—6 of FIG. 2.

A safety feature is incorporated in certain of the push-pull rods 110B, 112A, 114B and 116B to avoid damage should a jam occur on the conveyers. This feature comprises a pressable spring cup assembly 124 as shown in detail in FIG. 6. The rods are interrupted and the ends are provided with heads 236 and 238 after passing into the housing 230 through its base 232 and cap 234. A compression coiled spring 250 thrusts strongly against these heads 236 and 238 yet is compressible in case of trouble and thus avoids buckling of the rods.

As shown in FIG. 2 the cam followers 104 of push rods 114A and B which rock the frames carrying the cam sensing fingers 202A and B are provided respectively with fingers 274 and 270.

The finger 274 is arranged to contact a sensitive switch 272 and finger 270 another sensitive switch 268.

Should a sensing finger 202 fail to sense the last container of a complement of eight in the fill position under the nozzles the switch 268 and 272 will stop the fill motor 12.

Figure 7:
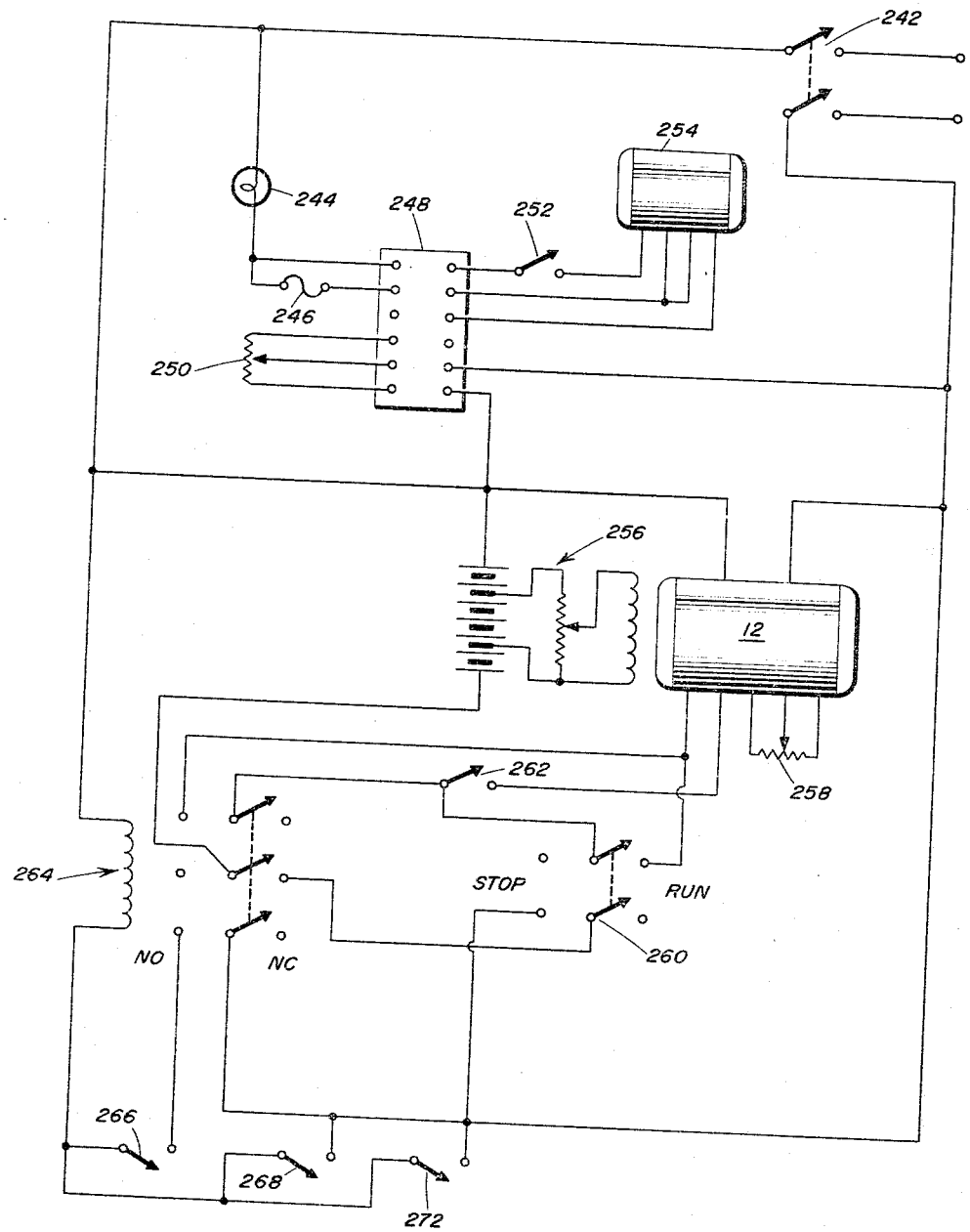
FIG. 7 is a schematic diagram of the electrical connections for the improved filler machine.

In the schematic diagram FIG. 7 for the filling machine 10, reference 242 is the main switch for the mains power. Reference 244 is a pilot lamp and 246 a fuse.

A commercial constant speed controller 248 with a speed control potentiometer 250 maintains a steady speed on the motor 254 which operates the conveyer belts 130A and B. Reference 252 is an emergency stop switch.

The fill motor 12 is likewise provided with a speed control potentiometer 258.

It further is equipped with a quick stop electronic brake 256 actuated by a relay 264. Reference 260 is the emergency stop switch for the fill motor 12. The fill-no-fill switch 262 allows the machine to advance containers to the point of filling without completing the cycle.

In FIG. 2 C1A are the filled containers from the A side moving out. C2B are the filled containers moving out from the B side. C3A are the containers being filled on the A side. C4B are empties moving in on the B side. C5A are empties waiting on the A side.

This brief explanation should be studied in conjunction with the captions in FIGS. 8 and 9 which explain the operation of the double acting pumps 34, fill nozzles 178 and fingers 146, 202, and 22.

Obviously many modifications and variations of the present invention are possible in light of the above teachings. It is, therefore, to be understood that within the scope of the appended claims the invention may be practiced otherwise than as specifically described.

What is claimed is:

1. Apparatus for filling containers with fluid, comprising structure defining a filling area having two filling lines, means alternately positioning at least one of said containers in each of said lines, double-acting means continuously and alternately filling the containers in one of said lines and then the containers in the other of said lines, and means removing the filled containers from said one line while said containers in said other line are being filled, whereby containers are constantly being filled in said filling area while empty and filled containers are constantly being positioned in and removed from, respectively, said filling area.

2. The apparatus as recited in claim 1, wherein said alternately positioning means includes a pair of continuously operating conveyors, one passing through each filling line for conveying containers therethrough and said structure includes first finger elements alternately interrupting the conveying of said containers into each said filling liner, and second finger elements for retaining said containers in its respective filling line only while being filled with said fluid.

3. The apparatus as recited in claim 1, wherein said double-acting means includes a reciprocating pump having a fluid inlet and outlet passage at each end thereof and valve means for controlling the flow of said fluid alternately through the outlet passages and through the inlet passages of said pump.

4. The apparatus as recited in claim 3, wherein a plurality of said containers are present in each said filling line and a plurality of pumps are provided; and means reciprocating the pistons of said plurality of pumps in unison.

5. Apparatus for filling containers with fluid, comprising means continuously advancing said containers, means dividing the continuously advanced containers into two filling lines, means alternately and temporarily restraining groups of said containers from being advanced along said two filling lines, and means continuously filling said groups of containers while restrained in their respective filling line, whereby while a group of containers in one of said filling lines is being filled, a group of filled containers is being advanced from the restrained position and a group of empty containers is being advanced into the restrained position of the other of said filling lines.

6. The apparatus as recited in claim 5, wherein the filling means includes a double-acting reciprocating pump supplying said fluid to one of said filling lines upon stroking in one direction and to the other of said filling lines upon stroking in the other direction.

References Cited

UNITED STATES PATENTS

| 1,451,512 | 4/1923 | Kellogg | 141—248 X |
| 2,268,876 | 1/1942 | Kagley | 141—140 |
| 2,536,299 | 1/1951 | Martin | 141—248 |
| 2,989,993 | 6/1961 | Osmond et al. | 141—169 X |
| 3,020,939 | 2/1962 | Donofrio | 141—169 |
| 3,036,604 | 5/1962 | Donofrio | 141—180 X |

LAVERNE D. GEIGER, *Primary Examiner.*

H. S. BELL, *Assistant Examiner.*